UNITED STATES PATENT OFFICE.

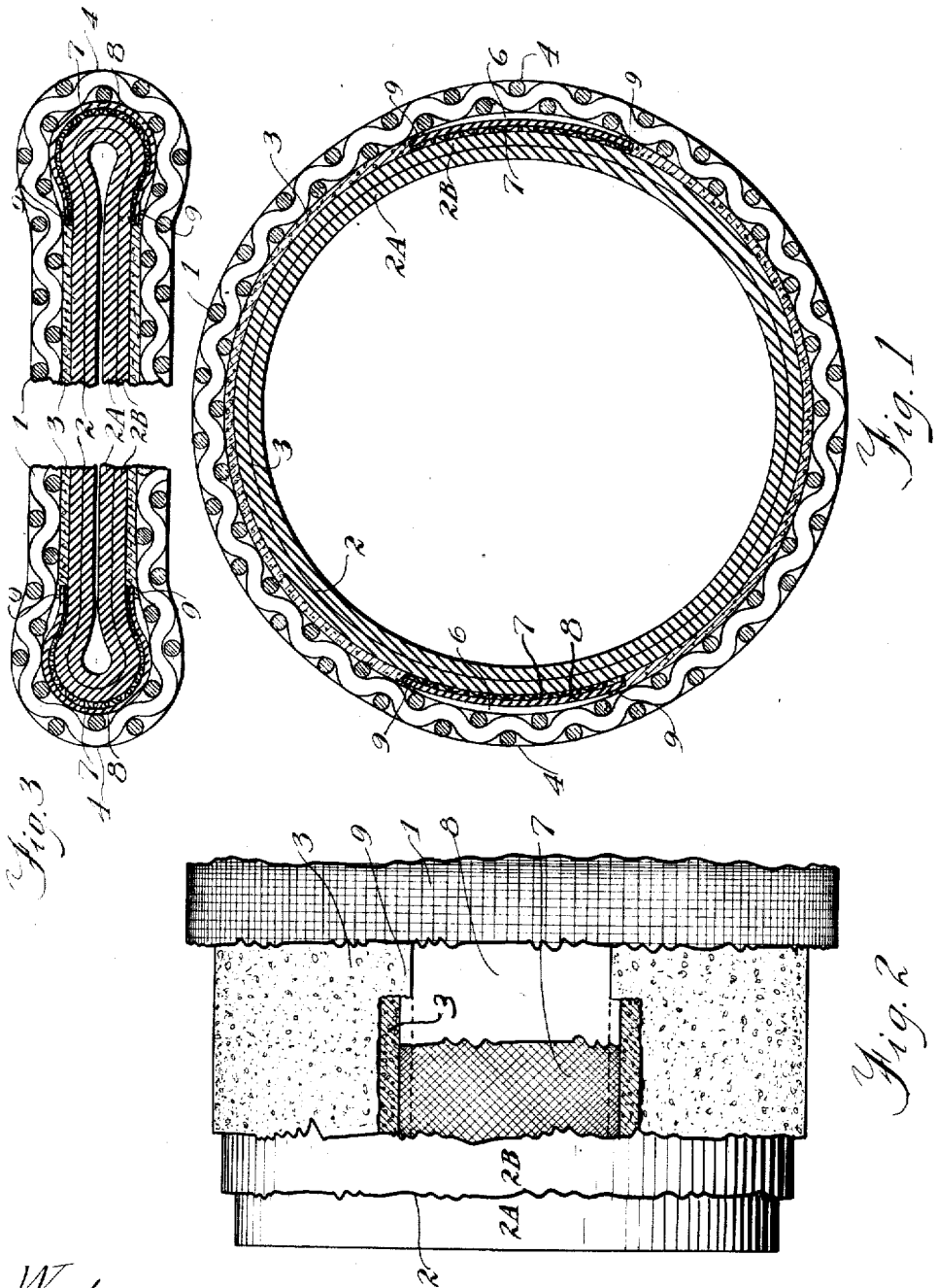

CASSIUS M. CLAY BAIRD, OF CHICAGO, ILLINOIS.

HOSE CONSTRUCTION.

1,301,354.                Specification of Letters Patent.       Patented Apr. 22, 1919.

Application filed July 11, 1917. Serial No. 179,857.

*To all whom it may concern:*

Be it known that I, CASSIUS M. CLAY BAIRD, a citizen of the United States of America, and a resident of Chicago, county of Cook, and State of Illinois, have invented certain new and useful Improvements in Hose Constructions, of which the following is a specification.

This invention relates to fire hose comprising an outer casing of heavy woven fabric enveloping an inner tubular casing of rubber, particularly that kind of hose described and claimed in my Patent No. 935,086, dated September 28, 1909, wherein the lining is free from the casing along and adjacent to the creases in the outer casing which are formed therein by the flattening of the hose.

The main objects of this invention are to provide an improved construction which will prevent the rubber lining from tearing after it has been cut or accidentally injured, as might occur when a heavy vehicle runs over it. Rubber has the peculiar characteristic of tearing easily along the line of a cut and continuing to tear indefinitely until a cross cut or transverse reinforcement of stronger material is reached. Consequently when fire hose has been injured so as to cut the lining, the strain due to the pressure of the water is likely to cause the lining to rip and it is to the prevention of such ripping that the present invention is particularly directed.

An illustrative embodiment of this invention is shown in the accompanying drawing, in which:

Figure 1 is an end view of a section of hose provided with the improved means for preventing cracking and tearing of the rubber lining.

Fig. 2 is a fragmentary side view of the hose wherein for clearness the various layers of material which make up the hose are shown extended one beyond the other and the cement layer is partly broken away to expose the marginal edges of the reinforcement.

Fig. 3 is an end section of the hose as it appears when folded.

In the construction herein shown in the drawings, the hose comprises an outer casing 1 which envelops a tubular lining 2 of rubber between which and the casing is a cementing layer of soft rubber or friction 3 adapted to secure the lining in proper position within the casing.

The tubular lining 2 is preferably of composite construction and is made up of an inner layer $2^A$ of 40% Para rubber, and a center layer $2^B$ of approximately 30% Para rubber. The third or cementing layer 3 consists of soft rubber or friction, which secures the casing and tube together.

The outer casing 1, which serves as a protector for the rubber lining, may be of any suitable material, that illustrated in the drawings being a heavy, coarse woven fabric. The flattening of the hose as is customary when stored either in stacks or upon reels forms creases 4 in the opposite sides thereof.

As explained in my said patent, the cementing layer of soft rubber or friction 3 secures the greater part of the lining 2 to the casing 1, but is omitted from the portions of the lining and casing in the vicinity of the creases 4, thus providing free sections 6 of the lining. When hose of this kind is flattened, the free sections of the lining and the casing are independently bent or curved so as to obviate the pinching and distortion of the lining that occurs in other forms of hose where the lining is cemented to the casing at these points. This obviates the hardening and cracking of the lining along the crease and increases the life of the hose very largely.

In order to prevent the possibility of the pressure causing a further tearing of the rubber lining along the free portion after a crack or hole has been accidentally formed in said free portion by mechanical injury, the free sections of the lining are reinforced by strips of fabric 7, preferably cut on the bias and properly sized with rubber.

The strips of fabric 7 may be placed between the layers $2^A$ and $2^B$, but are preferably placed between the layer $2^B$ and a strip of approximately 45% Para rubber 8 which is attached to the lining where it is free from the casing. This strip of fabric, being inserted between the lining or plies of the rubber, prevents the water from getting to it from either the outside or inside and thus prevents its rotting.

The fabric 7 may be comparatively thin, closely woven material, and should be of the same width as the free sections 6 of the lining. The reinforcement 7 need not necessarily be fabric, but may be any material which provides tough fibers extending crosswise of the strip. Whether fabric or other woven material is used, it is usually cut on a bias as indicated by Fig. 2, so that it offers greater resistance to the tearing of the lining than would be the case if the strip were used with the threads running parallel with the length thereof.

The cementing layer 3 usually overlaps the lateral edges of the strips 7 and 8, as shown at 9, so that the free area is of somewhat less width than the reinforcement.

Although but one specific embodiment of this invention has been herein shown and described, it will be understood that some details of the construction shown may be altered or omitted without departing from the spirit of this invention as defined by the following claims.

I claim:

1. A hose, comprising an outer casing creased longitudinally so as to be flat when not in use, a rubber lining within said casing, a layer of cement attaching said lining to said casing intermediate said creases, leaving said lining free from said casing along and adjacent to said creases, laterally disposed reinforcing strips of fabric imposed upon the outer face of said lining along the free sections thereof, and strips of rubber imposed upon said strips of fabric and secured to said lining but free from said casing.

2. A hose, comprising an outer casing creased longitudinally so as to be flat when not in use, a rubber lining within said casing, a layer of cement attaching said lining to said casing intermediate said creases, leaving said lining free from said casing along and adjacent to said creases, laterally disposed reinforcing strips of fabric imposed upon the outer face of said lining along the free sections thereof, and strips of rubber imposed upon said strips of fabric and secured to said lining but free from said casing, said cement layer overlapping the lateral edges of said superposed strips of fabric and rubber.

Signed at Chicago this 3rd day of July 1917.

CASSIUS M. CLAY BAIRD.